UNITED STATES PATENT OFFICE.

THEODORE A. WILLARD, OF CLEVELAND, OHIO.

STORAGE-BATTERY SEPARATOR AND PROCESS OF PRODUCING SAME.

1,342,611. Specification of Letters Patent. Patented June 8, 1920.

No Drawing. Application filed October 5, 1917. Serial No. 194,870.

*To all whom it may concern:*

Be it known that I, THEODORE A. WILLARD, a citizen of the United States, residing at Cleveland, in the county of Cuyahoga and State of Ohio, have invented a certain new and useful Improvement in Storage-Battery Separators and Processes of Producing Same, of which the following is a full, clear, and exact description.

This invention relates to storage battery separators and to a process of producing same. It is customary to apply ribs to storage battery separators, particularly if formed wholly or partially of rubber, by vulcanizing rib forming material in the form of strips or strands to the separator blanks. In accomplishing this it is customary to use a two-part vulcanizing mold, one half of which has grooves to receive the rib forming material, and to place the rib forming material previously cut to the right length in the grooves of one half the mold and the separator blank in the other half, after which the two halves of the mold are clamped together and the whole is then placed in a vulcanizer. During the vulcanization the ribs become united to the separator plate or body.

This process, while satisfactory in many respects, has the disadvantage that the rib forming strips or strands must be handled one at a time and it is sometimes the case that the rib forming strips are not properly laid in the grooves of the mold, or if properly laid they at times curl out of place before the two halves of the mold are clamped together, with the result that after vulcanization it is found that the ribs are not properly applied to the separator, rendering it unsuitable for use.

It is the aim of the present invention to provide a new and improved product in the form of a ribbed separator and a process of ribbing which is more economical than the prior process in time and labor required to carry it into effect, and which results in the ribs being more securely attached to the separator blanks and invariably properly positioned thereon.

In carrying out the invention I do not rely entirely on vulcanization for securing the ribs in place, but fasten them mechanically before vulcanization to the desired portions of the separator plate or blank. I accomplish this preferably by first sewing the rib forming strips or strands on the separator blanks, and I employ for this purpose a multi-needle sewing machine having as many needles as there are ribs to be applied to the plate, and spaced apart the exact distance that the ribs are to be spaced apart.

The separator plates previously formed are fed rapidly through the machine beneath the needles, and at the same time continuous rib forming strands or strips also previously formed, are fed from suitable spools, one provided for each needle, down on the plates beneath the needles so that they are sewed directly to the plates. A single operator can in this manner apply rib forming material to the plates as rapidly as the latter can be fed in continuous succession through the machine.

As the plates pass from the machine in close succession or end to end they are connected together by the parallel rows of rib forming material.

Next the rib forming strips which fasten the plates together are severed between the plates and the latter with the short lengths of rib forming material sewed thereto are placed in vulcanizing molds and the ribs and plates are vulcanized together.

In accomplishing the vulcanizing part of the process I may use molds which accommodate a single plate, or molds which accommodate a plurality of plates arranged end to end. If a single-plate mold is employed, the string or series of plates which pass from the sewing machine will be cut into single or separate plates, but if molds are employed which accommodate more than one plate, the string or series of plates from the sewing machine are preferably cut in pairs or in groups of three or more as the case may be, with the groups fastened by the rib forming material until after vulcanization when they will be separated by cutting the rib forming material between the separators.

With this process the ribs are fastened very securely, and there is avoided any loss due to incorrect positioning of the ribs as was sometimes the case with the prior process. At the same time the ribbing of the separators is accomplished with expenditure of less time and labor than heretofore required.

While my process can be carried out using different materials than specified below, I prefer to employ for this purpose separator plates composed of rubber and fibrous threads, and known as the Willard thread rubber separators, or the Willard threaded rubber insulation. For the rib forming material I prefer to use rubber covered or rubber coated fibrous cords such as disclosed in my pending application, Serial No. 166,553, filed May 5, 1917, for storage battery separators. Before the application of the ribs, the plates are in preferably semi-vulcanized condition, and the cords are preferably coated or covered with uncured rubber. After vulcanization the plates and rib forming material are hard and completely cured.

To prevent the rubber coated cords sticking together when wound on the spools it can be coated with flour or similar substance.

Having described my invention, I claim:—

1. A storage battery separator having rib forming material sewed thereto.

2. A storage battery separator having ribs mechanically fastened and vulcanized thereto.

3. A storage battery separator having ribs sewed and vulcanized thereto.

4. A process of ribbing storage battery separators which comprises sewing rib forming material to the separators.

5. A process of ribbing storage battery separators which comprises mechanically fastening and then vulcanizing rib forming material thereto.

6. A process of ribbing storage battery separators which comprises sewing and then vulcanizing rib forming material thereto.

7. A process of ribbing storage battery separator blanks which comprises sewing continuous rib forming material in the form of strips or strands to a series of separator blanks, severing the rib forming material between the blanks, and then vulcanizing the rib forming material to the blanks.

8. A process of forming ribbed separators which comprises sewing rib forming material in the form of rubber covered cords to separator blanks composed at least in part of rubber, and then vulcanizing the blanks with the rib forming material sewed thereto.

In testimony whereof I hereunto affix my signature.

THEODORE A. WILLARD.